(12) United States Patent
Lewin-Eytan et al.

(10) Patent No.: US 8,750,131 B2
(45) Date of Patent: Jun. 10, 2014

(54) DYNAMIC MAPPING IN A MULTICASTING ENVIRONMENT

(75) Inventors: Lian Lewin-Eytan, Binyamina (IL); Nir Naaman, Haifa (IL); Shahar Chen, Omer (IL); Yoav Tock, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/346,747

(22) Filed: Jan. 10, 2012

(65) Prior Publication Data

US 2013/0176855 A1 Jul. 11, 2013

(51) Int. Cl.
*G01R 31/08* (2006.01)
(52) U.S. Cl.
USPC ........... 370/241; 370/229; 370/235; 370/238; 370/329
(58) Field of Classification Search
USPC .......................... 370/229, 235, 238, 329, 241
See application file for complete search history.

(56) References Cited

U.S. PATENT DOCUMENTS

| | | | |
|---|---|---|---|
| 6,336,119 B1 | 1/2002 | Banavar et al. | |
| 6,349,340 B1 | 2/2002 | Dyer et al. | |
| 6,728,715 B1 | 4/2004 | Astley et al. | |
| 7,293,109 B2 | 11/2007 | Ott et al. | |
| 7,523,208 B2 | 4/2009 | Auerbach et al. | |
| 7,680,900 B2 | 3/2010 | Duigenan et al. | |
| 2008/0031243 A1 | 2/2008 | Gershinsky et al. | |

OTHER PUBLICATIONS

Adler et al., "Channelization problem in large scale data dissemination", In International Conference on Network Protocols, pp. 100-109, 2001.*
Tock et al., "Hierarchical clustering of message flows in a multicast data dissemination system", In S. Q.Zheng, editor, IASTED PDCS, pp. 320-326. IASTED/ACTA Press, 2005.*
Adler et al., "Channelization problem in large scale data dissemination", In International Conference on Network Protocols, pp. 100-109,2001.
Banerjee et al., "Scalable application layer multicast", In SIGCOMM '02: Proceedings of the 2002 conference on Applications, technologies, architectures, and protocols for computer communications, vol. 32, pp. 205-217, New York, NY, USA, Oct. 2002. ACM.
Bickson et al., "A hybrid multicast-unicast infrastructure for efficient publish-subscribe in enterprise networks", In SYSTOR '10, the 3rd Annual Haifa Experimental Systems Conference, 2010.
Castro et al., "Scribe: a large-scale and decentralized application-level multicast infrastructure", Selected Areas in Communications, IEEE Journal on, 20(8):1489-1499, 2002.

(Continued)

*Primary Examiner* — Xavier Szewai Wong
*Assistant Examiner* — Natali N Pascual Peguero
(74) *Attorney, Agent, or Firm* — Jason Far-hadian, Esq.; Century IP Group

(57) ABSTRACT

Enhancing performance in a multicasting system comprising monitoring filtering costs in a multicasting system as system characteristics change over time, wherein the multicasting system is operating based on a first mapping, between a plurality of data flows and multicasting groups, to disseminate data to users that subscribe to one or more of the data flows; computing a second mapping in response to determining that overhead associated with filtering of unwanted flows at the user level has exceeded a threshold; and transitioning the multicasting system from using the first mapping to using the second mapping, in response to determining that the second mapping is feasible as applicable to one or more constraints associated with the multicasting system.

20 Claims, 8 Drawing Sheets

(56) References Cited

OTHER PUBLICATIONS

Stephen E Deering and David R. Cheriton, "Multicast routing in datagram internetworks and extended LANs", ACM Trans, Comput, Syst., 8(2):85-110, May 1990.

El-Ansary et al., "Efficient Broadcast in Structured P2P Networks", In F. Kaashoek and I. Stoica, editors, LNCS (The 2nd International Workshop on Peer-To-Peer Systems), vol. 2735, pp. 304-314, 2003.

TH. Eugster et al., "The many faces of publish/subscribe", ACM Comput. Surv., 35(2):114-131, Jun. 2003.

Tock et al., "Hierarchical clustering of message flows in a multicast data dissemination system", In S. Q.Zheng, editor, IASTED PDCS, pp. 320-326, IASTED/ACTA Press, 2005.

Vigfusson et al., "Dr. multicast: Rx for data center communication scalability", In Proceedings of the 5th European conference on Computer systems, EuroSys '10, pp. 349-362, New York, NY, USA, 2010. ACM.

Wong et al., "A preference clustering protocol for large-scale multicast applications", In Networked Group Communication, pp. 1-18, 1999.

Wong et al., "An evaluation of preference clustering in large-scale multicast applications", In Proceedings of IEEE INFOCOM (2), pp. 451-460, 2000.

Guimaraes et al., "A Genetic Algorithm for Multicast Mapping in Publish-Subscribe Systems", Second IEEE International Symposium on Network Computing and Applications, 2003. NCA 2003, pp. 67-74, Apr. 2003.

Fang Zhao et al., "Online Network Coding for the Dynamic Multicast Problem", IEEE International Symposium on Information Theory, 2006.

\* cited by examiner

DYNAMIC MAPPING IN A MULTICASTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing data dissemination in a communication environment and, more particularly, to a system and method for dynamically updating the data dissemination mappings in a multicasting system.

BACKGROUND

Multicasting environments provide means to disseminate content related to a great variety of topics to multitudes of subscribers. The content of each topic is delivered over an information flow, where each flow is associated with one or more multicast groups as shown in FIG. 1. In the following, topics and flows are used interchangeably. Multicasting schemes are generally more favorable than unicast methods, as multicasting is a more efficient method for delivering messages to multiple subscribers who are interested in the same data flows.

Since multicast groups are associated with limited resources, in many cases the number of flows is considerably larger than the number of groups, which means that multiple flows should be transmitted over a single group. As such, a mapping scheme is implemented to manage the relationships between flows and groups. Referring to FIG. 1, for example, flows $F1, F2, \ldots F_K$ are mapped to multicast groups $G1, G2, \ldots, G_M$ in order to be transmitted to multiple users $U1, U2, \ldots, U_N$, according to the users' interest in different flows.

In a large-scale multicast system, the limitations in the number of multicast groups lead to mapping of flows to a plurality of multicast groups also known as "channelization". Depending on the mapping and the degree of overlap in the interest of different users, this may result in a user, receiving flows that the user is both interested in and flows in which the user has no interest. In other words, depending on the topic of interest, a user subscribes to a multicast group on which both interesting and non-interesting flows are multicasted. The user receives all the flows multicasted on that group and filters out the flows that are not of interest.

As shown in FIG. 1, a user Un may be interested in a single flow F1. Since Un is interested in receiving F1, it subscribes to G1 to which F1, F2 and Fk are mapped. As such, by way of subscribing to G1, Un will receive F1, F2, and Fk as all these flows are transmitted over G1. Un will now have to filter out the unwanted flows F2 and Fk. In this example, Un has an overhead associated with having to filter out the unwanted flows F2 and Fk. Also, Un's overall reception capacity for receiving flows of interest is diminished, when it allocates its resources to receiving the unwanted flows F2 and Fk.

Based on the above example, it can be seen that the higher the rate of the unwanted flows received by a user, the higher are the penalties associated with filtering and reception capacity. To avoid these penalties, it is desirable to implemented a mapping scheme that minimizes the filtering overhead and adheres to a user's reception capacity, particularly taking into consideration changes in subscribers' interest and topic rate (i.e., the rate at which data is transmitted on a topic or flow).

In a multicasting systems, the subscribers' interest and topic rate may be monitored in order to be able to update the mappings between flows and groups to maintain an appropriate level of performance. In such systems, a new mapping is computed, from time to time, to achieve a more efficient multicast experience by moving the flows between groups based on the observed changes. For example, in FIG. 1, if it is noticed that U1 is no longer interested in receiving F2 (and that no other user subscribed to G1 is not interested in F2 either), then the mapping may be updated so that F2 is no longer mapped to G1. As a result, U2 and Un will no longer need to filter out F2. As another example, if user U2 is no longer interested in Fk, then Fk can be removed from G1 sparing U1, U2, and Un from filtering Fk (note that Fk is also mapped to Gm).

Note that prior to the remapping, G1 multicasted both flows F1 and F2 to all three users U1, U2 and Un. Out of the three users, two of them, namely U2 and Un, had to filter out F2 under the earlier mapping because users U2 and Un were not interested in receiving the flow F2. After the change in mapping, however, G1 only multicasts F1 to all three users U1, U2 and Un. As a result, U2 and Un no longer have the processing overhead associated with having to filter out F2 as they did under the prior mapping. As such, the filtering overhead has been reduced due to the updated mapping.

In some multicasting frameworks, information about the system's overhead and changes in users interest is gathered during the current operation period. Based on such information, a new mapping for the subsequent operation period is computed and applied. The transition to new mapping may introduce added complexity to the system and adversely affect the reception capacities of the users. Such factors should be taken into account when computing a new mapping.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for enhancing performance in a multicasting system comprises monitoring filtering costs in a multicasting system as system characteristics change over time, wherein the multicasting system is operating based on a first mapping, between a plurality of data flows and multicasting groups, to disseminate data to users that subscribe to one or more of the data flows; computing a second mapping in response to determining that overhead associated with filtering of unwanted flows at the user level has exceeded a threshold; and transitioning the multicasting system from using the first mapping to using the second mapping, in response to determining that the second mapping is feasible as applicable to one or more constraints associated with the multicasting system.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, a mapping scheme is provided that helps minimize the strain on the resources and the operation of a multicasting system as the system mapping is being reconfigured or updated. The mapping is dynamically updated to address inefficiencies in the multicasting system associated with the changes that occur during operation as subscriber interests or availability of resources change in real time. The mapping scheme is optionally designed to update the mapping in a continuous and uninterrupted manner.

Figure 1:
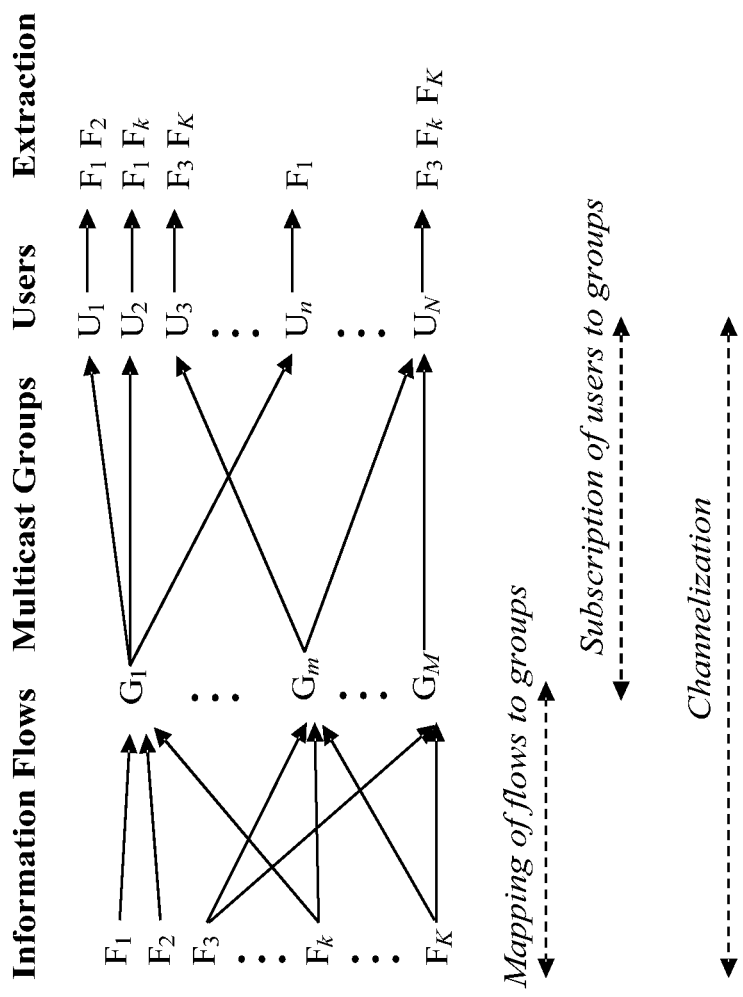
FIG. 1 illustrates an exemplary multicasting environment in accordance with one or more embodiments, wherein a plurality of topic flows are mapped to a plurality of groups and subscribers.
Figure 2:
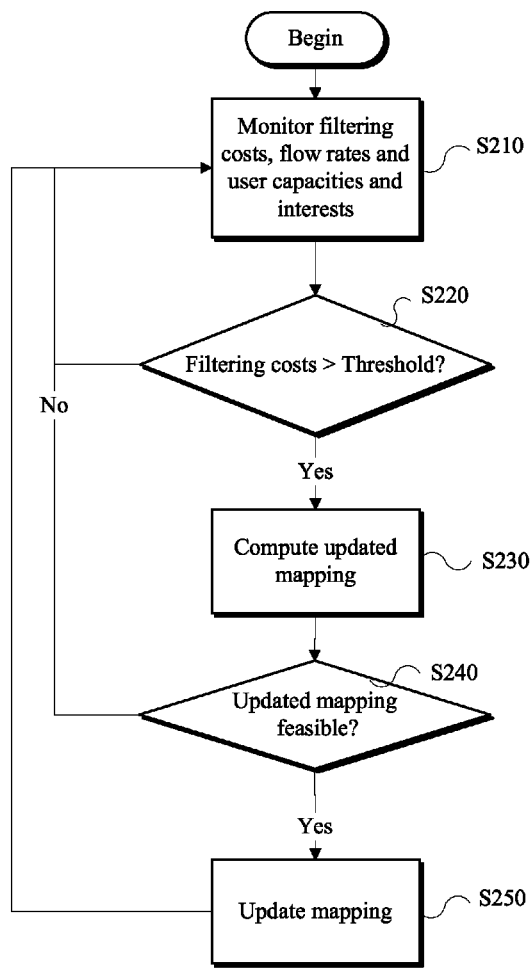
FIG. 2 is a flow diagram of an exemplary method of updating the mapping in a multicasting system, in accordance with one embodiment.

Referring to FIG. 2, in one implementation, the mapping scheme is configured to track system efficiency by, for example, monitoring the filtering costs, the flow rates and user interests in the multicasting system, as subscriber interest or other factors change during operation (S210). In one embodiment, the filtering cost is calculated based on the sum of the filtering costs for the receiving subscriber nodes in the system during a fixed mapping period (i.e., a time period when the mapping is not updated).

If the filtering costs are determined to be above a certain threshold (S220), then the mapping algorithm computes an updated mapping to optimize the multicasting system (S230). The updated mapping cost is calculated based on the mapping costs associated with finding a solution (i.e., a remapping) that indicates the flows that are to be remapped to different groups in the multicasting system. The mapping cost may also include the transition costs associated with actions taken to update the mapping from flows to groups. The transition costs include the costs associated with a possible peak in filtering while the remapping is taking place.

A peak in filtering may occur when a flow in which a user is interested changes groups, from a first group to a second group, while the mapping is being updated. During the transition period, the user may be a member of both the first and the second groups, and thus filter unwanted flows from both groups. This duplicate group membership helps prevent the possibility of data loss, and ensures messages are not delayed as the flows are being remapped during a transition period. Albeit, this solution has the penalty of increasing the filtering overhead during the transition period for the affected subscriber nodes and the multicasting system overall.

Figure 3:
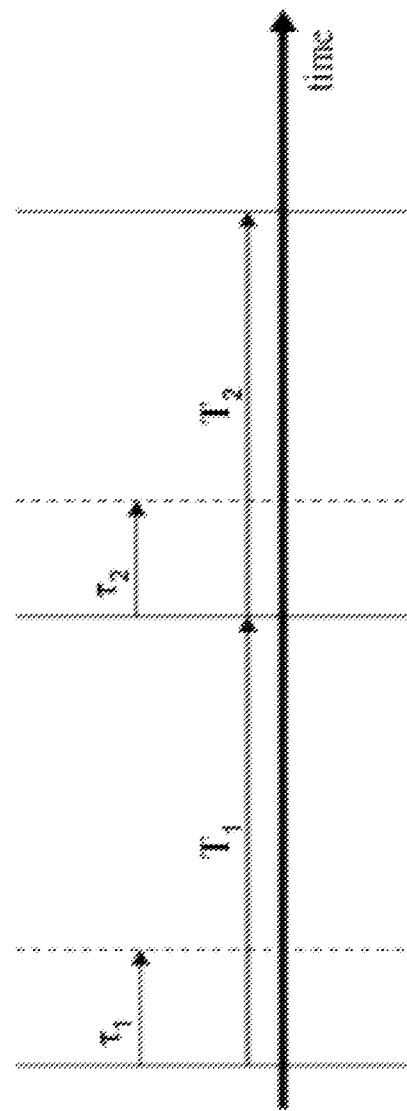
FIG. 3 is an exemplary temporal diagram illustrating the transition period during which a mapping in a multicast environment is updated, in accordance with one embodiment.

Referring to FIG. 3, as hinted earlier, the operation time of a multicasting system may be divided into time periods, where a time period (T) ends when a new mapping is computed at run time and the current mapping is updated. The time during which the update is performed represents a transition period ($\tau$). The duration of a time period T is denoted by |T| and the duration of transition time $\tau$ is denoted by |$\tau$|. During the transition time $\tau$, the flows in the multicasting system are remapped.

Due to the limitations associated with the allocation of resources to a subscriber node, each user has a limited reception capacity. As such, the updating scheme is also configured to avoid causing a user having to reach near or above a reception capacity threshold. A cost function may be used to monitor reception capacity of subscriber nodes and prevent users from operating at or near capacity. This may be accomplished by determining the efficiency of a mapping solution with respect to the current state of the system based on the cost function that takes into consideration the residual reception rate capacities of the users.

Figure 4:
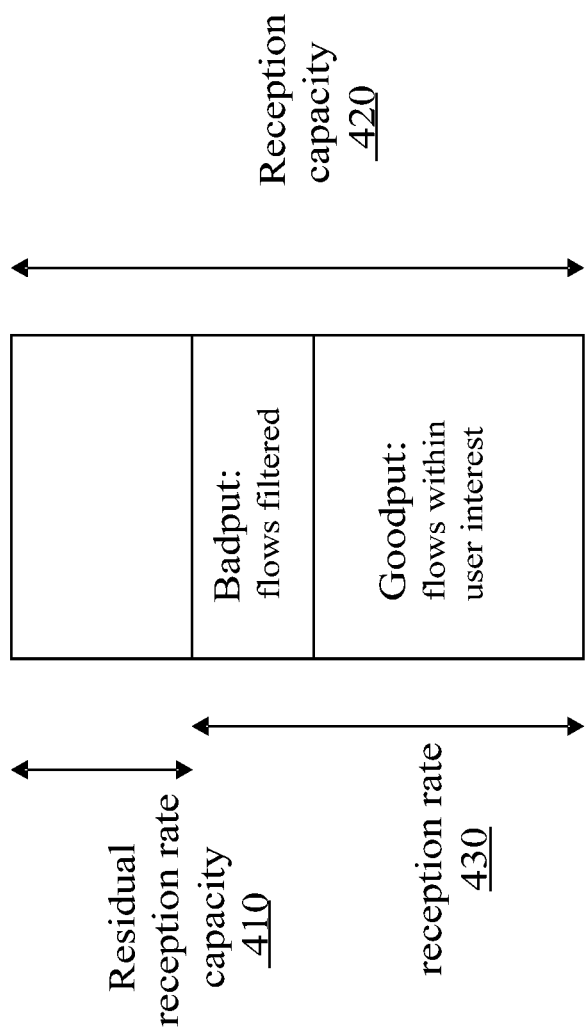
FIG. 4 is an exemplary block diagram of residual reception rate capacity for a receiving subscriber node is determined, in accordance with one embodiment.

Referring to FIG. 4, in one embodiment, a residual reception rate capacity 410 may be calculated based on the total reception capacity 420 and the actual reception rate 430 at a receiving node. The reception rate 430 is the sum of the rates of flows that a user receives that are within its interest (i.e., goodput) and the rate of flows to be filtered by the user (i.e., badput). Thus, the cost function may be configured to evaluate the updated mapping costs according to the filtering rates (e.g., badput) of the subscriber nodes and their residual reception rate capacities.

In other words, the residual reception rate capacity 410 indicates how close the user is to its full capacity of reception. For example, if residual capacity is low then it may mean that the user is getting too much badput and is working too hard to filter out flows to which it has not subscribed. It is noteworthy that a user may also be receiving a lot of goodput that brings the user close to capacity. In that case, a small amount of badput may push him over the capacity limit.

Accordingly by monitoring residual reception rate capacity 410, the users with reception rates that are close to full capacity may be identified. It is noteworthy that calculating the filtering rate alone will indicate which users are working hard to filter out badput, but does not reflect the users that are close to full capacity. As such, in one implementation, the residual reception capacities are integrated in the formula used for calculating the filtering costs.

Referring back to FIG. 2, once it is determined that the filtering costs of the current mapping are above a threshold, then an updated mapping is computed with the intention of finding a new mapping that minimizes the weighted sum of the filtering costs for the receiving subscriber nodes in the system, desirably during both a fixed mapping period (T−τ) and a transitional mapping period (τ). In more detail, if φ[T] represents the overall filtering cost of the system during |T| and φ[τ] represents the overall filtering cost during transition time |τ|, the total weighted filtering cost may be computed according to the following formula:

$$\varphi = \frac{|T|-|\tau|}{|T|}\varphi[T] + \frac{|\tau|}{|T|}\varphi[\tau]$$

In accordance with one embodiment, a new mapping that minimizes the total weighted filtering and transition costs with respect to the current state of the system may be accordingly computed. As provided in further detail below, if the computed updated mapping is determined to be feasible over the current mapping (S240), then the current mapping is updated accordingly (S250). Otherwise, the current mapping is not updated and the system continues monitoring the filtering costs, flow rates and user interests (S210). As the monitoring continues, another computation may be initiated after some other changes are made in the system (e.g., when additional changes in users' interest, flow rates, or number of multicast groups are detected).

To determine whether the updated mapping is feasible, in one embodiment, the distance between a flow and a group at time T may be calculated, as provided in further detail below, where the distance represents the filtering costs to the users, if the flow is transmitted over the group at time T. Accordingly, the total amount of excess filtering due to two or more flows being clustered into the same group as a result of the updated mapping may be determined The updated mapping will optionally not over burden a subscriber node beyond its reception capacity or other capacity related threshold. In one embodiment, if as the result of the updated mapping, the residual reception rate capacity of a user during τ remains positive, then the updated mapping is deemed to be feasible.

In other words, a decision to switch to a newly computed mapping may be based on the cost savings associated with operating the system according to a new mapping and/or the costs of transition associated with switching from a current mapping to the new mapping, wherein the updated mapping scheme in addition to minimizing the total filtering cost is configured to also take into account the users receptions rate capacity and to prevent mappings that will result in a user receiving more traffic than desired. This measure is calculated by monitoring the reception rate of each user (i.e., the sum of goodput and badput) as dependent on (1) the mapping and (2) flow rates.

The computation of the total filtering cost may be further enhanced by using a heuristic where the expected time period during which a flow's mapping will stay fixed is considered. In other words, the mapping scheme may be implemented so that in addition to minimizing the total filtering cost it also takes into account the stability of a flow over time. For example, in case a flow is stable, then the transition cost for moving it to a new group is likely to be paid. This way, a lower long-lasting fixed mapping cost will be achieved for a flow.

A flow is deemed stable if its audience (i.e., users interested in the flow) is stable, or if the flow's rate is deemed stable over time. Depending on implementation, a flow stability measure may be used to justify tolerating a higher transition cost for a flow if the new mapping for that flow is expected to last a relatively long time. Flows that are expected to be short-lived, in contrast, may be allowed to switch groups if the associated transition costs are relatively small. The stability factors may be measured based on statistical analysis of the flow over time, in accordance with one embodiment.

Since a mapping is generally updated to provide a more efficient way of multicasting, it is desirable to support or invest in remapping the flows into a grouping that provides more efficiency. Thus, for each flow its stability time may be determined In one embodiment, the expected total filtering cost of flow $f_k$ during a future time period may be represented by $\phi[\{\hat{T}_k\}, f_k]$, where $\hat{T}_k$ is the expected length of the next stable time period for flow $f_k$.

In one embodiment, the expected total filtering cost of $f_k$ during transition time is denoted by $\phi[\tau, f_k]$, where τ is the length of a transition period, where the length of a transition period is fixed. The total filtering cost φ of both transition period and fixed-mapping period is represented by the weighted sum of the filtering costs over the active flows F during these periods, and is calculated according to the formula:

$$\varphi = \sum_{f_k \in F}\left(\frac{|\hat{T}_k|-|\tau|}{|\hat{T}_k|}\varphi[\hat{T}_k, f_k] + \frac{|\tau|}{|\hat{T}_k|}\varphi[\tau, f_k]\right)$$

As noted, a higher transition cost is tolerated if the new flow mapping is expected to last and shorter-lived mapping updates are tolerated, if the corresponding transition costs are lower, in accordance with one embodiment. It is noteworthy that the filtering cost of a flow $f_k$ is a function of the users that filter this flow and of their residual reception capacities, as well as the rate of the flow. The cost incurred upon a user in a certain configuration depends on its goodput, badput, and reception rate capacity as provided earlier.

In summary, in one embodiment, cost functions may be defined based on residual reception capacities for subscriber nodes in a multicasting system where the costs of filtering are monitored. As the residual reception capacity for the nodes decreases, the cost functions may indicate that the filtering has become too costly. If so, the mapping of communication flows and groups in the subject multicasting system is dynamically updated to minimize the filtering costs at the receiving subscriber nodes, optionally, also taking into account the total costs associated with the updating process and the stability of the flows over time.

In some implementations, the cost function captures the burden incurred upon the users with respect to the mapping solution and following the transitions between mappings. Accordingly, the load on network devices (e.g., routers and switches) may be taken into consideration when configuring a multicasting framework. For example, in cases where a data structure that supports the mapping (e.g., a multicast tree) is used to map each group to a user, a network device may be treated as a virtual user, whose flow interest is the union of the subscriptions of the users that are fed by the device. The capacity associated with the network device may be derived from its cross-cut bandwidth capacity and the amount of bandwidth allocated for multicast to enable a mapping algorithm to efficiently compute maps, while considering the load and constraints of both users and network devices in the multicasting framework.

In accordance with one embodiment, a multicasting framework may comprise a data bus, over which published data is delivered to the subscribers, and a control bus, used to monitor and manage the system. Data from publishers may be delivered to the subscribers directly or using a broker. In addition, the framework may comprise a rate monitor o collect the rate of the data flows, and a capacity monitor to monitor rate reception capacities of the subscribers and deliver the related information to one or more management or control units.

The management and control units ensure that the multicasting framework is working efficiently. A subscription management unit may control subscription and publishing operations and prevent operations that may cause the system to become unstable. For example, users will be denied subscriptions that would cause them, or other elements of the system, to operate beyond their capacity. A flow control unit may keep the system within a feasible workload by controlling the rate at which data is published over the various flows and by performing corrective actions according to the capacities of the subscribers, and possibly other elements such as routers or switches.

It is noteworthy that subscription management and flow control are briefly covered in this disclosure so as not to detract from system elements related to the mapping schemes and computations and the transition management features which coordinate the transition from one mapping to another. It is also noteworthy that the multicasting framework is likely to include other management units (e.g., security/authorization) and monitoring units (e.g., network monitoring) that are not fully disclosed herein for the purpose of brevity.

In accordance with one embodiment, the multicasting framework is configured to automatically respond to dynamic changes in the system, and maintains a continuous 24/7 efficient mapping solution in desirably a self-managed and self-optimized manner. After collecting the required information regarding data rates, subscriptions and capacities, an updated mapping is computed. The system is then automatically transferred from current to new mapping. As such, an advanced smart mapping algorithm is provided that computes the dynamic mapping updates, while taking into account various costs and constraints that are associated with mapping transition.

In the following, an exemplary mapping scheme in accordance with one embodiment is provided in further detail. According to the exemplary embodiment below, a multicasting model and a migration algorithm in addition to one or more methods for calculating the associated costs are disclosed. It is noteworthy that the detailed features disclosed below are by way of example and should not be construed as limiting the scope of the claimed subject matter to the particular details that are provided to help better understand the underlying features and elements.

Model

Let $F=\{f_1, \ldots, f_K\}$ denote the set of information flows, $|F|=K$. At time t, flow $f_k$ produces a sequence of messages with rate $\lambda_k[t]$ messages per second. Let $U=\{u_1, \ldots, u_N\}$ denote a set of users (consumers), $|U|=N$. At each time t, each user $u_n$ is associated with a binary "interest vector" $w_n[t]$ of length K, where a 1' in the kth position denotes his interest in flow $f_k$ at time t. The interest matrix $W[t]=(w_{nk}[t]), f_k \in F, u_n \in U$, holds the interest vectors of all users at time t:

$$w_{nk}[t] = \begin{cases} 1 & \text{user } u_n \text{ is interested in } f_k \text{ at time } t \\ 0 & \text{otherwise} \end{cases}$$

Each flow is mapped into a multicast group. Let $G=\{g_1, \ldots, g_M\}$ denote the set of multicast groups, $|G|=M$. In the general case, a flow might be mapped to more than one multicast group. However, in order to avoid the complications associated with duplication, in this work we restrict each flow to be mapped to a single multicast group.

The mapping matrix at time t, $X[t]=(x_{km}[t]), f_k \in F, g_m \in G$, is defined as follows.

$$x_{km}[t] = \begin{cases} 1 & \text{flow } f_k \text{ is mapped to } g_m \text{ at time } t \\ 0 & \text{otherwise} \end{cases}$$

The subscription matrix at time t, $Y[t]=(y_{nm}[t]), n \in U, m \in G$, specifies the multicast groups that each user must be subscribed to.

$$y_{nm}[t] = \begin{cases} 1 & \text{user } u_n \text{ is subscribed to } g_m \text{ at time } t \\ 0 & \text{otherwise} \end{cases}$$

As a flow is mapped to a single multicast group, given the interest matrix $W[t]$ and mapping matrix $X[t]$, then $Y[t]=p(W[t] \cdot X[t])$, where $B=p(A)$ is the point-wise step operator ($p_{i,j}=1$ for $a_{i,j}>0$, and 0 otherwise).

The solution to the channelization problem is a pair $(X, Y)$ (mapping and subscription matrices). A feasible solution must comply with the "no false exclusion" constraint, according to which all the flows that are within a user interest are mapped to one or more groups joined by the user. That is, $$\sum_{g_m \in G} y_{nm}[t] \cdot x_{km}[t] - w_{nk}[t] \geq 0.$$

$$\forall u_n \in U, f_k \in F.$$

One objective is to compute a feasible solution minimizing the cost function to be defined in the following section.

Filtering Costs

One objective is to alleviate the end-node processing load. We thus consider only filtering processing costs, both during the time interval corresponding to a fixed mapping, and during the transition period from one mapping to another.

The filtering process is made of two stages. Messages sent on multicast groups the user is not listening to are filtered by the network elements and network interface card, with no cost to the user. Superfluous flows that belong to a group the user is subscribed to are dropped second.

Flow Filtering Cost During a Fixed-Mapping Time Period.

We consider a time period $T_i$, and use the simplifying assumption according to which the subscription during $T_i$ stay fixed. The mapping and subscription matrices during time period $T_i$ are denoted by $X[T_i]$ and $Y[T_i]$ respectively. We denote the expected total filtering cost during this time period by $\phi[T_i]$. For every flow $f_k$ in a group joined by the user, a cost $\alpha \cdot \lambda_k[T_i]$ is added, where $\lambda_k[T_i]$ is the expected rate of $f_k$ during $T_i$. Thus, $$\varphi[T_i] = \sum_{u_n \in U} \sum_{g_m \in G} \sum_{f_k \in F} y_{nm}[T_i] \cdot x_{km}[T_i] \cdot \alpha \cdot \lambda_k[T_i] \quad (1)$$

Flow Filtering Cost During Mapping-Transition Time.

Given mapping and subscription matrices of two consecutive time periods, $X[T_{i-1}], Y[T_{i-1}]$ and $X[T_i], Y[T_i]$, we can compute both the mapping and subscription matrices during the transition time $\tau_i$ from $X[T_{i-1}]$ to $X[T_i]$. The mapping and subscription matrices of this time period are denoted by $X[\tau_i]$ and $Y[\tau_i]$ respectively. We note that the computation of these matrices depends on the algorithm used for transition from one mapping to another. An example of such a transition algorithm is presented in Section, along the computation of transition mapping and subscription matrices $X[\tau_i], Y[\tau_i]$. We denote the expected total filtering cost during transition time $\tau_i$ by $\phi[\tau_i]$. Thus, $$\varphi[\tau_i] = \sum_{u_n \in U} \sum_{g_m \in G} \sum_{f_k \in F} y_{nm}[\tau_i] \cdot x_{km}[\tau_i] \cdot \alpha \cdot \lambda_k[\tau_i] \quad (2)$$

The total filtering cost of both mapping-transition and fixed-mapping periods is represented by the weighted sum of filtering costs $$\varphi^i = \frac{|T_i| - |\tau_i|}{|T_i|} \varphi[T_i] + \frac{|\tau_i|}{|T_i|} \varphi[\tau_i], \quad (3)$$

where $|T_i|$ and $|\tau_i|$ are the lengths of the fixed-mapping period and the mapping-transition period respectively (the length $|\tau_i|$ is either fixed or variable, depending on the migration protocol). Note that subject to the no-false-exclusion constraint, minimizing $\phi^i$ is equivalent to minimizing the extra filtering work due to the superfluous flows received by the users.

We denote the end of time period $T_{i-1}$ by $T_{i-1}^{end}$. Given the interest matrix $W[T_{i-1}^{end}]$ at that time, and given the current mapping $X[T_{i-1}]$, one objective is to compute a new feasible mapping $X[T_i]$ minimizing the filtering cost $\phi^i$. Such a mapping is said to be optimal with respect to the over-all filtering cost. The dynamic channelization problem can be thus defined in the following way. For each time period $T_i$, given F, $\lambda[T_i]$, G, U, $W[_{i-1}^{end}]$ and $X[T_{i-1}]$, find an optimal mapping $X[T_i]$. Note that the subscription matrix $Y[T_i]$ is computed with respect to the interest matrix $W[T_{i-1}^{end}]$ and the new mapping $X[T_i]$.

Migration Algorithm

The transition phase from mapping $X[T_{i-1}]$ to $X[T_i]$ comprises of moving all flows that change groups between the two consecutive mappings, that is, all flows $f_k$ for which $X_{(k,\cdot)}[T_{i-1}] \neq X_{(k,\cdot)}[T_i]$ (where $X_{(k,\cdot)}$ corresponds to the kth row of X). A migration protocol defines the process of migrating a flow from one multicast group to another. There are many possible migration protocols, and the mapping transition cost can be calculated for any such protocol. In this section, the mapping transition cost is calculated by way of an exemplary transition algorithm such as that disclosed in U.S. patent application Ser. No. 11/461,495, filed on Aug. 1, 2006, the content of which is incorporated herein by reference in its entirety. It is noteworthy, however, that said exemplary transition algorithm is one of many possible available options and as such the scope of the claimed subject matter should not be construed as limited to the details provided in this example.

Figure 5:
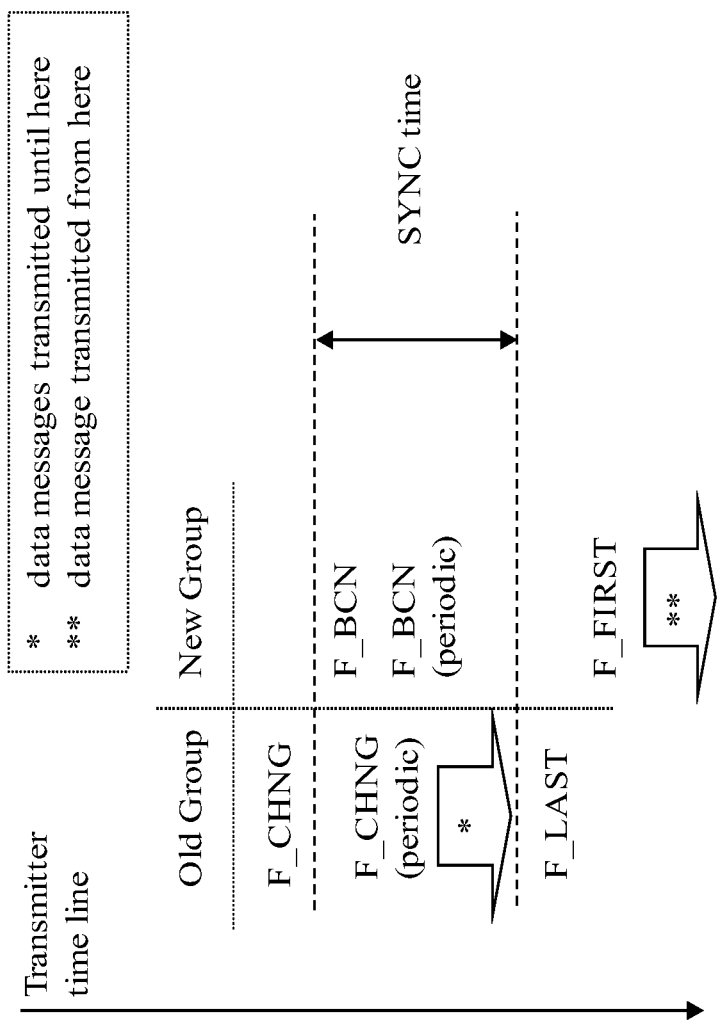
FIG. 5 is an exemplary illustration of a migration of a flow from and old group to a new group, in accordance with one embodiment.

The migration algorithm we use as example is presented in FIG. 5. It is an efficient algorithm guaranteeing that message ordering in each information flow is maintained, and that messages are not lost nor duplicated. The migration process uses the primitives and infrastructure of well known reliable multicast protocols (such as PGM) and standard unicast transport (such as TCP). The algorithm proceeds by transmitting four types of signal messages:

1. First signal (F_CHNG) is transmitted on the source stream to inform the clients on the upcoming change.
2. Second signal (F_BCN) is transmitted on the target stream as a beacon signal that allows clients to "tune in" to the new stream before data from the migrated flow is transmitted on it.
3. Third signal (F_LAST) transmitted on the source stream indicates that no additional messages from the migrated flow are transmitted on that stream.
4. Fourth signal (F_FIRST) transmitted on the target stream indicates that messages from the migrated stream are now being transmitted on the new stream.

The first two signals constitute the "prepare" phase, whereas the last two signals constitute the "switch" phase. Proper spacing between the prepare and switch phases increase the likelihood that the receivers successfully follow the transmitter's instructions. The receiver protocol is designed to handle the fact the two streams are not synchronized, and the fact that the identity of the first message on a new stream is not deterministic.

The algorithm specified does not duplicate messages of migrating flows, but rather synchronizes the movement of users between the groups according to the new subscription matrix $Y[T_i]$. We consider the new time period $T_i$, where all flows are mapped to their new groups according to $X[T_i]$, as starting with the transmission of the first signal for each migrating flow (see FIG. 5). The beacon messages transmitted during the transition period (SYNC time) are ignored in the filtering cost computation, as their rate can be neglected. Thus, the mapping matrix during transition phase $X[\tau_i]$ is simply equal to the mapping matrix of the previous time period, $X[\tau_i]=X[T_{i-1}]$.

Consider a flow $f_k$ migrating from $g_1$ to $g_2$, followed by the migration of a user $u_n$ from $g_1$ to $g_2$. During the transition phase, $u_n$ needs to be subscribed to both $g_1$ and $g_2$, as control messages of $f_k$ will be transmitted over both groups during the migration process. Therefore, users are subscribed both to their old and new groups during transition, and the subscription matrix $Y[\tau_i]$ is thus computed as $Y[\tau_i]=(Y[T_{i-1}] \vee Y[T_i])$ (where (A $\vee$ B) is the bitwise 'OR' operation).

The Dynamic Mapping Algorithm

In the general case, one can map a flow to more than one group. We limit our attention to the "no-duplication" case, where a flow can be mapped to a single group. Since messages are not duplicated, transmission rate is kept to a minimum, saving transmitter and network resources. Moreover, the no-duplication constraint significantly reduces the management costs of the system. This is especially important for a large scale system like the one we explore.

The "no-duplication" constraint allows the mapping process to be viewed as clustering flows to groups. We use the well-known k-means clustering method as the base of our dynamic mapping algorithm, and develop respective measure functions used by the algorithm so as to obtain a solution with low weighted filtering cost. In the following section we describe a distance measure derived from $\phi[T_i]$ and $\phi[\tau_i]$, that will form the heart of the clustering algorithm.

Centroid and Distance Measures

Every flow $f_k$ is associated with an audience vector $W_{(.,k)}[t]$ and a message rate $\lambda_k[t]$ at time t. The binary audience $W_{(.,k)}[t]$ is the kth column of the interest matrix $W[t]$. The coordinates of $W_{(.,k)}[t]$ are users, and thus flows can be considered to be points in a "user-interest" space. The distance between two points (flows) at time t is defined as $$D(f_z, f_j)[t] = D(W_{(.,z)}[t], W_{(.,j)}[t]) \quad (4)$$
$$= \sum_{u_n \in U} d(w_{nj}[t] - w_{nz}[t], \lambda_z[t], \lambda_j[t])$$

where $$d(x, \lambda_1, \lambda_2) = \begin{cases} 0 & x = 0 \\ \lambda_1 & x > 0 \\ \lambda_2 & x < 0. \end{cases} \quad (5)$$

The function $D(f_z, f_j)[t]$ quantifies the amount of excess filtering incurred upon the users due to $f_z$ and $f_j$ at time t, in case $f_z$ and $f_j$ are clustered into the same group. (Note that (4) is not a proper distance measure as it does not maintain the triangle inequality.)

For each group $g_m$, we define a centroid $C_m[t]$ at time t as follows:

$$C_m[t] = \bigvee_{\{j : x_{jm}[t]=1\}} W_{(.,j)}[t] = Y_{(.,m)}[t] \quad (6)$$

where $\vee$ is the bitwise 'OR' operator, and $Y_{(.,m)}$ is the mth column of Y.

In other words, $C_m(n)[t]=1$ (coordinate n of vector $C_m[t]$) if user $u_n$ is subscribed to group $g_m$ at time t. We define $C_m[t]_{\backslash f_k} = \bigvee_{\{j : x_{jm}[t]=1, j \neq k\}} W_{(.,j)}[t]$ as the centroid of $g_m$ without flow $f_k$ at time t. We denote by $\theta_m[t] = \sum_{\{j : x_{jm}[t]=1\}} \lambda_j[t]$ the total rate of the flows in $g_m$ at time t, and by $\theta_m[t]_{\backslash f_k} = \sum_{\{j : x_{jm}[t]=1, j \neq k\}} \lambda_j[t]$ the total rate of the flows in $g_m$ except $f_k$ at time t.

The distance between a flow $f_k$ and a group $g_m$ at time t represents the filtering cost occurred to the users in case $f_k$ is transmitted over $g_m$ at t, and is defined as $$D(f_k, g_m)[t] = \sum_{u_n \in U} d(C_m(n)[t]_{\backslash f_k} - w_{nk}[t], \lambda_k[t], \theta_m[t]_{\backslash f_k}), \quad (7)$$

where $d(.,.,.)$ is defined in (5). Considering $C_m[t]_{\backslash f_k}$ (and not $C_m[t]$) is meaningful for the computation of the distance only if $f_k$ is already in $g_m$.

Dynamic Mapping Measures

Given a mapping $X[T_{i-1}]$ and an interest matrix $W[T_{i-1}^{end}]$, we use the K-means algorithm to compute a new mapping $X[T_i]$ with a low filtering cost $\phi^i$ as defined in Equation (3).

For each group $g_m$, we consider two centroids: the fixed-mapping centroid $C_m[T_i]$, corresponding to the audience of $g_m$ during time period $T_i$, and the mapping-transition centroid $C_m[\tau_i]$, corresponding to the audience of $g_m$ during the transition period $\tau_i$. Recall that given two consecutive mapping and subscription matrices, $X[T_{i-1}], Y[T_{i-1}]$ and $X[T_i], Y[T_i]$, the matrices $X[\tau_i], Y[\tau_i]$ are computed as specified in Section, $$X[\tau_i] = X[T_{i-1}] \quad (8)$$

$$Y[\tau_i] = (Y[T_{i-1}] \vee Y[T_i]). \quad (9)$$

For ease of notation, we denote $W[T_{i-1}^{end}]$ simply by W, and $W_{(.,k)}[T_{i-1}^{end}]$ by $W_{(.,k)}$. The fixed-mapping centroid $C_m[T_i]$ of a group $g_m$ is defined as $$C_m[T_i] = \bigvee_{\{j : x_{jm}[T_i]=1\}} W_{(.,j)} = Y_{(.,m)}[T_i]. \quad (10)$$

In other words, $C_m(n)[T_i]=1$ if user $u_n$ subscribes to group $g_m$ during $T_i$. The distance function between a flow $f_k$ and $C_m[T_i]$ is defined as $$D(f_k, g_m)[T_i] = \sum_{u_n \in U} d(C_m(n)[t]_{\backslash f_k} - w_{nk}, \lambda_k[T_i], \theta_m[T_i]_{\backslash f_k}), \quad (11)$$

where $\lambda_k[T_i]$ is the expected rate of $f_k$ during time period $T_i$, and $\theta_m[T_i] = \sum_{\{j : x_{jm}[T_i]=1\}} \lambda_j[T_i]$.

The mapping-transition centroid $C_m[\tau_i]$ of a group $g_m$ is defined as $$C_m[\tau_i] = \bigvee_{\{j : x_{jm}[\tau_i]=1\}} W_{(.,j)} = Y_{(.,m)}[\tau_i] \quad (12)$$
$$= \bigvee_{\{j : (x_{jm}[T_{i-1}]=1 \vee x_{km}[T_i]=1)\}} W_{(.,j)}$$
$$= Y_{(.,m)}[T_{i-1}] \vee Y_{(.,m)}[T_i].$$

In other words, $C_m(n)[\tau_i]=1$ if user $u_n$ subscribes to $g_m$ either during $T_{i-1}$, or during $T_i$.

In order to compute the distance function between a flow $f_k$ and $C_m[\tau_i]$ we distinguish between two cases:

(1) Flow $f_k$ is not in $g_m$ according to $X[T_{i-1}]$, i.e., $x_{km}[T_{i-1}]=0$. The distance is then defined as $$D(f_k, g_m)[\tau_i] = \sum_{u_n \in U} d(C_m(n)[\tau_i] - w_{nk}, 0, \theta_m[\tau_i]), \quad (13)$$

where $\theta_m[\tau_i]$ is the expected total rate of the flows in $g_m$ during transition time, i.e., $\theta_m[\tau_i] = \sum_{\{j : x_{jm}[T_{i-1}]=1\}} \lambda_j[\tau_i]$. Note that during transition time, the flows in $g_m$ are the flows mapped to $g_m$ according to $X[T_{i-1}]$. The second parameter of the distance function in this case is 0 (and not $\lambda_k[\tau_i]$), as the new flow $f_k$ is not transmitted over $g_m$ during transition time. However, users interested in $f_k$ still have to be subscribed to $g_m$ during transition, for needs of synchronization.

(2) Flow $f_k$ is in $g_m$ according to $X[T_{i-1}]$, i.e., $x_{km}[T_{-1}]=1$. The distance is then defined as $$D(f_k, g_m)[\tau_i] = \sum_{u_n \in U} d(C_m(n)[\tau_i]_{\setminus f_k} - w_{nk}, \lambda_k[\tau_i], \theta_m[\tau_i]_{\setminus f_k}). \quad (14)$$

Here, the second parameter of the distance function is $\lambda_k[\tau_i]$, as flow $f_k$ is transmitted over $g_m$ during transition time, and is filtered by users of $g_m$ that are not interested in it.

Dynamic Mapping K-Means

We use the K-means clustering algorithm, with flows and centroids as points in user-interest space, and (7) as a distance measure between them. Assume that at the end of a time period $T_{i-1}$ the total filtering cost of the system reaches the threshold $\Delta$, and a new mapping is computed for $T_i$. The new mapping computation algorithm proceeds as follows:

1) Initialize: Initialize $X[T_i]=X[T_{i-1}]$=and $Y[T_i]=Y[T_{i-1}]$. Initialize $X[\tau_i]=X[T_{i-1}]$ and $Y[\tau_i]=Y[T_{i-1}]$. Calculate the centroid $C_m[T_i]$ of each group $g_m$ (Equation 10). Initialize $C_m[\tau_i]=C_m[T_i]$ for each group $g_m$.
2) Nearest neighbor: Pick a point $f_k$ and reassign it to the closest group $g_m$, using the weighted sum of distances from both centroids $$\frac{|\tau|}{|T_i|}D(f_k, g_m)[\tau_i] + \frac{|T_i|-|\tau|}{|T_k|}D(f_k, g_m)[T_i].$$

Do not reassign in case of a tie.

3) Centroid: Assume $f_k$ was taken from group $g_l$. Update the new mapping $X[T_i]$ as well as the fixed-mapping centroids $C_l[T_i]$, $C_m[T_i]$ of groups $g_l$ and $g_m$. Update subscription matrices $Y[\tau_i]$, $Y[T_i]$ of mapping-transition and fixed-mapping periods. Update the mapping-transition centroids $C_l[\tau_i]$, $C_m[\tau_i]$ of groups $g_l$ and $g_m$.
4) Stop: if one pass over all the points does not produce a group change then stop; else go to step 2.

Note that each step of the algorithm can only reduce the cost $\phi^i$, and thus convergence is guaranteed. However, the algorithm does not guaranty convergence to a global minimum. The standard approach is to restart the algorithm several times (with random initialization) and choose the best outcome. The stop condition can be augmented by limiting the number of iterations, running time, or the improvement rate of the total cost.

User Reception Rate Capacity

Up until now, the mapping algorithm did not take into account the fact that users (consumers) have limited reception capacities. A user trying (or being forced) to receive more than its capacity will loose messages. Message loss by a single user may affect other users as well, due to retransmission requests and data retransmissions, which further increase the load on the collective network resources. It is thus essential that the mapping will not require a user to receive more than its capacity. We define a feasible capacity mapping as a mapping where no user capacity constraint is violated. In addition, operating near the reception capacity of a user has critical performance implications. The closer a user is to its reception capacity, the longer the time messages have to wait in reception queues. Thus, filtering a message when operating close to capacity is more expensive than filtering it when operating at a low reception rate with respect to capacity.

These two observations lead us extend the flow-to-group distance measure defined in (7) as follow. We define the goodput of user $u_n$ by $$\Gamma_n[t] = \sum_{f_k \in F} w_{nk}[t] \cdot \lambda_k[t],$$

and its badput by $$\Delta_n[t] = \sum_{g_m \in G, f_k \in K} (y_{nm}[t] \cdot x_{km}[t] - w_{nk}[t]) \cdot \lambda_k[t].$$

For each user, the distance $d(.,.,.)$ in (7) is multiplied by a "penalty" function P that takes into account the user goodput, badput, and reception rate capacity:

$$\hat{D}(f_k, g_m)[t] = \sum_{u_n \in U} d(...) \cdot P(\Gamma_n[t], \Delta_n[t], C_n). \quad (15)$$

Following many experiments, a good choice for the penalty function is:

$$P(\Gamma, \Delta, C) = \coth\left(\frac{C}{C_0}\right)^{-1} \cdot \coth\left(\frac{C-\Gamma-\Delta}{C_0}\right).$$

Figure 6:
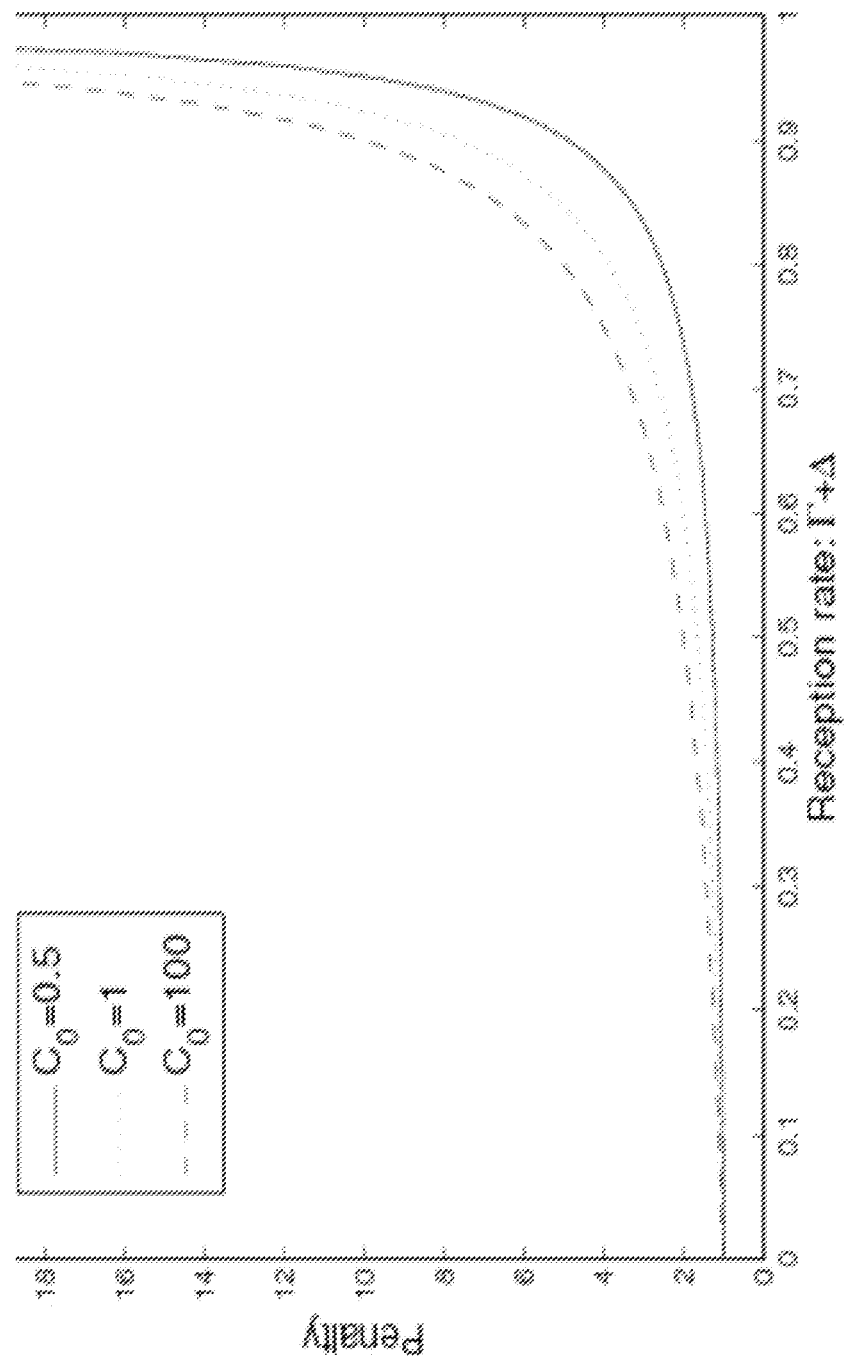
FIG. 6 is an illustration of a penalty function, graphically represented, in accordance with one embodiment.

This function is increasing in $(\Gamma+\Delta)\epsilon[0, C)$, and goes to infinity when the residual capacity $(C-\Gamma-\Delta)$ goes to zero (see FIG. 6). It guarantees reaching a feasible capacity mapping, and penalizes the operation of any user near its reception capacity.

We use this penalty function for both the transition period ($\hat{D}(f_k, g_m)[\tau_i]$) and time period ($\hat{D}(f_k, g_m)[T_i]$), since the capacity constraints of the user should be considered during the mapping transition period as well. Moreover, we found that it is sometimes impossible to migrate between two feasible capacity mappings ($X[T_{i-1}]$, $Y[T_{i-1}] \Rightarrow X[T_i]$, $Y[T_i]$) without violating the capacity constraint during transition.

Flow Stability Time

Our dynamic mapping algorithm aims to minimize the weighted filtering cost of the transition and fixed mapping:

$$\varphi = \frac{|T|-|\tau|}{|T|}\varphi[T] + \frac{|\tau|}{|T|}\varphi[\tau]. \quad (16)$$

Clearly, the smaller is the ratio $\tau/T$, the higher will be the cost of the mapping transition tolerated by the algorithm in order to achieve a lower fixed mapping cost. However, the goal of an effective dynamic mapping system is to react to configuration changes in the system applying short response times. Performing frequent re-mapping computations would thus result in short fixed periods T with respect to the transition periods $\tau$, prohibiting major changes during transitions.

In order to better handle this trade-off, we extend our algorithm and evaluate for each flow the expected "stable" time period during which its mapping will stay fixed (even though mapping updates involving other flows might occur meanwhile). This is specified by Equation 17, when computing the total filtering cost $\phi$ of both transition period and fixed-mapping period. Thus, in case the estimated stable mapping period of a flow is long enough, a transition cost is likely to be paid for this flow in order to lower the cost of the fixed mapping by moving it to a new group. The stable mapping period of a flow k, denoted by $\hat{T}_k$, is evaluated at the end of a time period $T_i$ according to its past stable mapping periods.

$$\varphi = \sum_{f_k \in F} \left( \frac{|\hat{T}_k| - |\tau|}{|\hat{T}_k|} \varphi[\hat{T}_k, f_k] + \frac{|\tau|}{|\hat{T}_k|} \varphi[\tau, f_k] \right). \quad (17)$$

We apply this extension by updating step 2 of K-means, as follows:

Nearest neighbor: Pick a point $f_k$ and reassign it to the closest group $g_m$, using the weighted sum of distances from both centroids $$\frac{|\tau|}{|\hat{T}_k|} D(f_k, g_m)[\tau_i] + \frac{|\hat{T}_k| - |\tau|}{|\hat{T}_k|} D(f_k, g_m)[T_i].$$

Do not reassign in case of a tie.

Note that $|\hat{T}_k|$ is the length of the expected stable mapping period of $f_k$, whereas $D(f_k, g_m)[T_i]$ is the distance of $f_k$ to the centroid of $g_m$ with respect to the new mapping and subscriptions at $T_i$. This heuristic is used in order to evaluate more accurately the trade-off of the filtering cost of $f_k$ during transition time versus its filtering cost until its next migration to a new group (that will not necessarily occur at the end of $T_i$).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 7A:
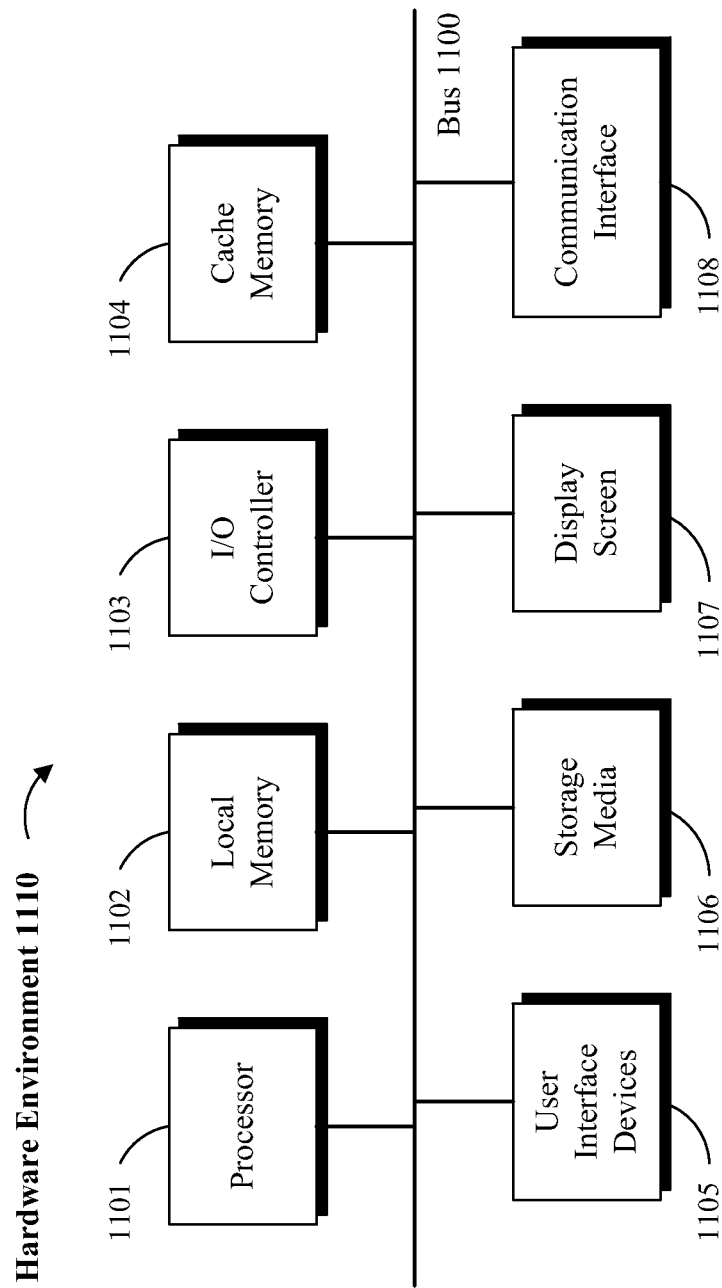
FIGS. 7A and 7B are block diagrams of hardware and software environments in which the disclosed systems and methods may operate, in accordance with one or more embodiments.
Figure 7B:
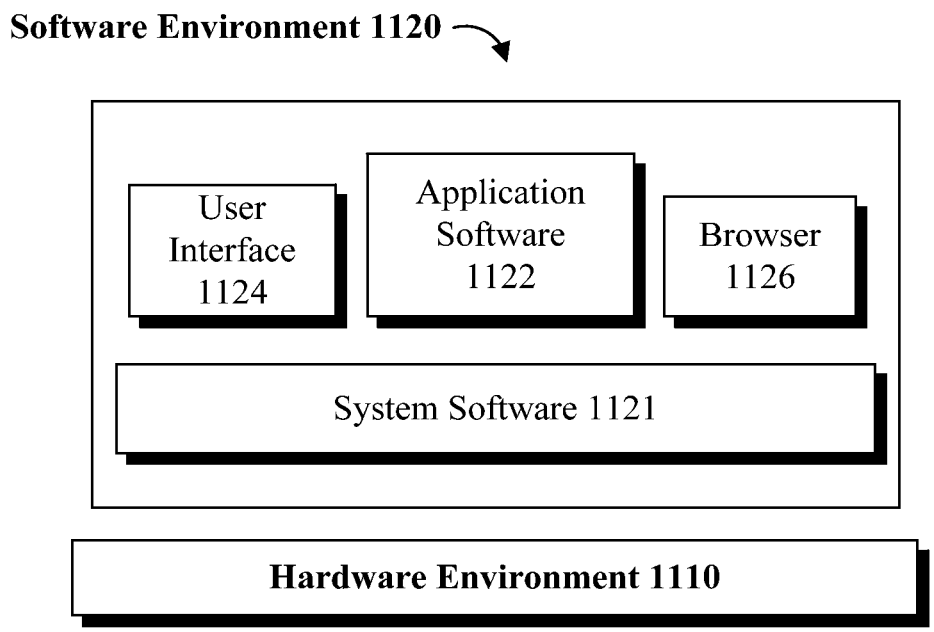

Referring to FIGS. 7A and 7B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 7A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 7B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for enhancing performance in a multicasting system, the method comprising: monitoring filtering costs in a multicasting system as system characteristics change over time, wherein the multicasting system is operating based on a first mapping, between a plurality of data flows and multicasting groups, to disseminate data to users that subscribe to one or more of data flows, wherein a user is identified by a subscriber node in the multicasting system; computing, using one or more processor, a second mapping in response to determining that overhead associated with filtering of unwanted flows at the user level has exceeded a threshold, wherein the second mapping minimizes weighted sum of the filtering costs for receiving subscribers nodes, during at least one of a fixed mapping period, which is a period when the mapping is not updated, and a transitional mapping period, which is a period updating from a current mapping to a new mapping; and transitioning the multicasting system from using the first mapping to using the second mapping, in response to determining that the second mapping is feasible as applicable to one or more constraints associated with the multicasting system, wherein the second mapping is deemed feasible if selected system resources are not taxed beyond a first threshold and overall transition costs remain below a second threshold; and wherein if the second mapping is deemed not feasible, repeat said monitoring filtering costs, computing second mapping and transitioning from using the first mapping to using the second mapping steps.

2. The method of claim 1, wherein the system characteristics comprise at least one of flow rates, user interests and user reception capacities.

3. The method of claim 1, wherein the constraints associated with the multicasting system relate to one of overhead associated with filter or user reception rate capacities.

4. The method of claim 1 wherein the second mapping is deemed feasible if the second mapping does not adversely affect reception rate capacities of one or more users beyond a certain level while the transition takes place.

5. The method of claim 1, wherein the second mapping is computed to optimize a target function that results in reducing the overhead costs in the multicasting system.

6. The method of claim 5 wherein the overhead costs include total weighted filtering costs in the multicasting system.

7. The method of claim 6 wherein the overhead costs further include costs associated with transitioning the multicasting system from the first mapping to the second mapping.

8. The method of claim 6 wherein the total weighted filtering costs are computed based on filtering costs for a period when the multicasting system is operating according to the first mapping, while taking into account added filtering costs during a transition period, when one or more users subscribe to groups according to both the first mapping and the second mapping.

9. The method of claim 7 wherein the transitioning costs are computed based on reception rate capacities of the users to prevent the updating if transitioning to the second mapping will result in a user receiving more traffic than a capacity-related threshold.

10. The method of claim 1 wherein the filtering costs for a user are calculated based on levels of goodput and badput received by the user.

11. The method of claim 10 wherein the goodput is the volume of data traffic received by a user in association with one or more flows in which the user is interested.

12. The method of claim 10 wherein the badput is the volume of data traffic received by a user in association with one or more flows in which the user is not interested.

13. The method of claim 2, wherein the reception capacity is determined based on level of resources allocated to a user for processing data transmitted to the user from the multicast groups to which the user has subscribed.

14. The method of claim 1, wherein the overhead associated with the filtering may be enhanced by using a heuristic where expected time period during which a flow's mapping stays fixed is considered.

15. The method of claim 14, wherein the second mapping is computed so that in addition to reducing the overhead associated with the filtering, stability of a flow over time is considered.

16. The method of claim 15, wherein the second mapping is computed such that, for a flow that is deemed stable in comparison to a threshold, transition cost for moving the stable flow to a new group are more likely to be paid than if the flow was deemed to be unstable.

17. A system comprising one or more processors for enhancing performance in a multicasting system, the system comprising: a logic unit for monitoring filtering costs in a multicasting system as system characteristics change over time, wherein the multicasting system is operating based on a first mapping, between a plurality of data flows and multicasting groups, to disseminate data to users that subscribe to one or more of the data flows, wherein a user is identified by a subscriber node in the multicasting system; a logic unit for computing a second mapping in response to determining that overhead associated with filtering of unwanted flows at the user level has exceeded a threshold, wherein the second mapping minimizes weighted sum of the filtering costs for receiving subscribers nodes, during at least one of a fixed mapping period, which is a period when the mapping is not updated, and a transitional mapping period, which is a period updating from a current mapping to a new mapping; and a logic unit for transitioning the multicasting system from using the first mapping to using the second mapping, in response to determining that the second mapping is feasible as applicable to one or more constraints associated with the multicasting system, wherein the second mapping is deemed feasible if selected system resources are not taxed beyond a first threshold and overall transition costs remain below a second threshold; and wherein if the second mapping is deemed not feasible, repeat said monitoring filtering costs, computing second mapping and transitioning from using the first mapping to using the second mapping steps.

18. The system of claim 17, wherein the second mapping is computed to optimize a target function that results in reducing the overhead costs in the multicasting system, wherein the overhead costs include total weighted filtering costs in the multicasting system and costs associated with transitioning the multicasting system from the first mapping to the second mapping.

19. A computer program product comprising a non-transitory data storage medium having a computer readable program, wherein the computer readable program when executed on a computer causes the computer to: monitor filtering costs in a multicasting system as system characteristics change over time, wherein the multicasting system is operating based on a first mapping, between a plurality of data flows and multicasting groups, to disseminate data to users that subscribe to one or more of the data flows, wherein a user is identified by a subscriber node in the multicasting system; compute a second mapping in response to determining that overhead associated with filtering of unwanted flows at the user level has exceeded a threshold, wherein the second mapping minimizes weighted sum of the filtering costs for receiving subscribers nodes, during at least one of a fixed mapping period, which is a period when the mapping is not updated, and a transitional mapping period, which is a period updating from a current mapping to a new mapping; and transition the multicasting system from using the first mapping to using the second mapping, in response to determining that the second mapping is feasible as applicable to one or more constraints associated with the multicasting system, wherein the second mapping is deemed feasible if selected system resources are not taxed beyond a first threshold and overall transition costs remain below a second threshold; and wherein if the second mapping is deemed not feasible, repeat said monitoring filtering costs, computing second mapping and transitioning from using the first mapping to using the second mapping steps.

20. The computer program product of claim 19, wherein the second mapping is computed to optimize a target function that results in reducing the overhead costs in the multicasting system, wherein the overhead costs include total weighted filtering costs in the multicasting system and costs associated with transitioning the multicasting system from the first mapping to the second mapping.

* * * * *